(12) United States Patent
Skillman et al.

(10) Patent No.: US 9,442,584 B2
(45) Date of Patent: Sep. 13, 2016

(54) ELECTRONIC DEVICE WITH RECONFIGURABLE KEYPAD

(75) Inventors: Peter Nils Skillman, San Carlos, CA (US); Robert Yuji Haitani, Menlo Park, CA (US); Eric Liu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1985 days.

(21) Appl. No.: 11/830,203

(22) Filed: Jul. 30, 2007

(65) Prior Publication Data

US 2009/0033522 A1   Feb. 5, 2009

(51) Int. Cl.
| | |
|---|---|
| H03M 11/00 | (2006.01) |
| H03K 17/94 | (2006.01) |
| G09G 5/00 | (2006.01) |
| G06F 3/02 | (2006.01) |
| G06F 3/041 | (2006.01) |
| G06F 1/16 | (2006.01) |
| G06F 3/045 | (2006.01) |

(52) U.S. Cl.
CPC ............. *G06F 3/041* (2013.01); *G06F 1/1626* (2013.01); *G06F 1/1692* (2013.01); *G06F 3/045* (2013.01); *G06F 3/0414* (2013.01)

(58) Field of Classification Search
USPC .................... 341/23; 345/173, 169; 455/566; 361/681
See application file for complete search history.

(56) References Cited

U.S. PATENT DOCUMENTS

| | | | |
|---|---|---|---|
| 6,329,967 B1 | 12/2001 | Little et al. | |
| 6,459,424 B1* | 10/2002 | Resman | 345/173 |
| 6,791,643 B2 | 9/2004 | Chuang | |
| 6,824,321 B2* | 11/2004 | Ward et al. | 400/479 |
| 7,570,259 B2* | 8/2009 | Banginwar et al. | 345/211 |
| 7,609,178 B2* | 10/2009 | Son et al. | 341/33 |
| 2003/0058265 A1 | 3/2003 | Robinson et al. | |
| 2003/0109286 A1* | 6/2003 | Hack et al. | 455/566 |
| 2004/0067768 A1 | 4/2004 | King et al. | |
| 2005/0277448 A1 | 12/2005 | Castaneda et al. | |
| 2006/0034043 A1* | 2/2006 | Hisano et al. | 361/681 |

(Continued)

FOREIGN PATENT DOCUMENTS

| | | |
|---|---|---|
| WO | WO 2007139349 A1 * | 12/2007 |
| WO | WO 2008/037275 A1 | 4/2008 |

OTHER PUBLICATIONS

Levin, M.D., "Guide to Display Technologies: Tactile Feedback for Touch Screens," Medical Electronics Manufacturing, Originally Published Fall 2006, Medical Electronics Manufacturing, [online] [Retrieved on Jan. 28, 2008] Retrieved from the Internet<URL:http://www.devicelink.com/mem/archive/06/10/012.html>.

(Continued)

*Primary Examiner* — Firmin Backer
*Assistant Examiner* — Jerold Murphy
(74) *Attorney, Agent, or Firm* — Paradice and Li LLP

(57) ABSTRACT

A reconfigurable keypad for enhancing user experience of an electronic device. The keypad includes a keypad display implemented as any type of display devices that can display different configurations of characters, symbols or images. The keypad display is placed adjacent an application display module. Both the keypad display and the application display module are covered with a common protective film, giving an appearance of a continuous top surface. The keypad also has a mechanism for providing tactile feedback to the user indicating whether the keypad was properly pressed.

16 Claims, 11 Drawing Sheets

(56) References Cited

U.S. PATENT DOCUMENTS

| | | |
|---|---|---|
| 2006/0268528 A1 | 11/2006 | Zadesky et al. |
| 2007/0035917 A1 | 2/2007 | Hotelling et al. |
| 2007/0075915 A1 | 4/2007 | Cheon et al. |
| 2007/0120999 A1 | 5/2007 | Hara |
| 2007/0123322 A1 | 5/2007 | Mizushina |
| 2007/0152983 A1 | 7/2007 | McKillop et al. |
| 2007/0159362 A1 | 7/2007 | Shen |
| 2007/0164980 A1* | 7/2007 | Manning ............... G06F 3/147 345/104 |
| 2007/0268264 A1 | 11/2007 | Aarras et al. |
| 2007/0296702 A1* | 12/2007 | Strawn et al. ............... 345/169 |
| 2008/0167081 A1* | 7/2008 | Eng .............................. 455/566 |
| 2009/0270078 A1* | 10/2009 | Nam .................... G06F 3/0238 455/414.1 |

OTHER PUBLICATIONS

O'Grady, J.D., "Patent Application Reveals Much About iPod/iPhone," Dec. 5, 2006, The Apple Core, ZDNet.com, CNET Networks, Inc., [online] [Retrieved on Jan. 28, 2008] Retrieved from the Internet<URL:http://blogs.zdnet.com/Apple/?p=346>.

"Pantech Dual-LCD Sliding Phone with OLED Touch Screen Keypad Offering Tactile Feedback," 2003-2007, gizmag, [online] [Retrieved on Jan. 28, 2008] Retrieved from the Internet<URL:http://www.gizmag.com/go/7219/>.

PCT International Search Report and Written Opinion, PCT/US08/68657, Aug. 26, 2008, 7 pages.

* cited by examiner

ELECTRONIC DEVICE WITH RECONFIGURABLE KEYPAD

BACKGROUND

1. Field of Art

The present disclosure relates generally to keypads for receiving user inputs for operating electronic devices, more specifically to keypads capable of changing its configuration according to input modes of the electronic devices.

2. Description of Related Art

A physical keypad includes a set of buttons or keys each mapped to represent a different number, letter, symbol or function. The physical keypads are often used in electronic devices such as telephones, Personal Digital Assistants (PDA), mobile computing devices, and remote controllers. The physical keypads are generally designed to be functionally adapted to the specific electronic devices. To provide the necessary functional user inputs to the electronic device, the physical keypads have a set of buttons or keys arranged in a particular configuration. The physical keypad is often the main area of user interaction. Therefore, the physical keypad is often designed to be aesthetically pleasing to the user.

It is generally preferable to provide the physical keypad with a minimum number of buttons or keys. A large number of buttons or keys in the physical keypads may cause confusion to the user as to which button to press. Also, the amount of space in the electronic device that can be used for placing the physical keypads is generally limited. Therefore, in order to put more buttons or keys in the physical keypads, the size of the buttons or keys needs to be reduced. The reduced size of the buttons or keys, however, makes it harder for the user to find and press the correct button of key.

Therefore, in some electronic devices, the same button of the physical keypad is used for indicating more than one number, letter, symbol or function that differ depending on the input modes of the electronic device. Using the same button to indicate different number, alphabet, symbol or function is advantageous because the number of buttons or keys can be reduced. The buttons or keys, however, must be printed or engraved with more than one number, alphabet, and symbol. Printing or engraving more than one number, letter, or symbol on the buttons or keys is aesthetically less pleasing. Also, physical keypads using such buttons or keys, however, may cause confusion to the user because the user may become uncertain which printing or engraving indicates the correct input in the current input mode. In addition, overpopulating a button with symbols or text could eventually make it difficult to read due to crowding in a limited space.

Another input device often used is a touchscreen. The touchscreens display graphical user interface to the user as well as receiving inputs from the user through the touch of the screen by a finger or a stylus. The touchscreens are often used in electronic devices to replace or supplement the keypads. The touchscreens are also capable of displaying various types of virtual keypads on the screen. Because the virtual keypads displayed on the touchscreen can be changed depending on the input modes of the electronic device, it is possible to display only the buttons or keys associated with the current input mode of the electronic device on the touchscreens. Therefore, using the virtual keypads is more intuitive to the user and aesthetically pleasing compared to the physical keypads.

The touchscreens, however, have the disadvantage of high power consumption. The touchscreens use display devices such as liquid crystal displays (LCD) that employ backlights. The backlight consumes considerable amount of electricity. Such high power consumption is especially problematic for mobile electronic devices that use batteries. Another issue in using the touchscreen is that the touchscreen provides limited or no tactile feedback. Therefore, it may be difficult for the user to tell whether the touchscreen was properly pressed or not.

Therefore, among other deficiencies, the present art lacks an input device that is less confusing to the user. The present art also lacks input devices that are aesthetically pleasing while consuming less power.

SUMMARY

Embodiments disclosed employs a reconfigurable keypad module that displays different combinations of numbers, letters, or symbols depending on the input mode of an electronic device. In one embodiment, buttons or keys relevant to the current input mode of the electronic device may be displayed. This reduces or eliminates users' confusion as to operating the electronic device using the keypads. The keypad is also aesthetically pleasing because the buttons or keys of the keypads do not appear crammed with more than one number, letter or symbol.

In one embodiment, the keypad module is separate from the main (or application) display module that serves as a primary display. The main (or application) display module is a high resolution display. The keypad module uses a low resolution keypad display that consumes less electricity compared to the main (or application) display module.

In one embodiment, the keypad display module is placed adjacent the main (or application) display module. By placing the keypad display module adjacent the main (or application) display module, the user of the electronic device can access both display modules conveniently. Also, placing the keypad display module adjacent the main (or application) display module allows the form factor of the electronic device to become compact. The top surface of the keypad display module is flush with the top surface of the main (or application) display module to give the feel of a continuous top surface. The top surface of the keypad display module and the top surface of the main (or application) display module may be covered with a protective film.

In one embodiment, the keypad display module includes a touch panel for sensing the input from the user. The keypad display module may also include tactile switches or metal snap domes to provide tactile feedback to the user, and to gate the operation of the keypad display module. Using tactile switches or metal snap domes is advantageous compared to other tactile feedback mechanisms because they are reliable and inexpensive to implement.

In other embodiment, the keypad display module includes a series of mechanical switches for sensing the input from the user. The mechanical switches sense the input from the user as well as providing the tactile feedback to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

Embodiments disclosed can be readily understood by considering the following detailed description in conjunction with the accompanying drawings.

DETAILED DESCRIPTION OF EMBODIMENTS

The user interface units of the following embodiments allow keypads of different configurations to be displayed on a keypad module according to the modes of electronic devices. A user of the device is presented with buttons or keys that are relevant or essential to the current operational status of the electronic devices. The keypad module uses a display device that consumes a small amount of power. A mechanism for providing tactile feedback to the user may be included in the keypad module. The changing keypad in conjunction with the tactile feedback provides enhanced user experiences.

An electronic device includes any devices operated by electricity that requires a user interface to interact with the user. The electronic devices include both mobile devices and stationary devices. The electronic devices may be operated by batteries or external power sources. The electronic devices include, among other devices, mobile phones, Personal Digital Assistants (PDAs), handheld game consoles, remote controllers, house appliances, mobile or desktop computers, and audio and video.

A main (or application) display module is a display module in the electronic device that serves as a primary display. The main (or application) display displays user and system applications, images, videos and the like. The main (or application) display module is often (but not necessarily) provided on a side of the electronic device that is most accessible to the user. The main (or application) display module includes, among other displays, backlit LCDs, reflective LCDs, electroluminescent (EL) displays, organic light-emitting diodes (OLED), electrophoretic displays (EPD), and bistable displays. The main (or application) display module displays various characters, symbols or images associated with the operation of the electronic device.

A keypad display is a display device associated with the keypad display module. The keypad display is separate from the main (or application) display module and displays buttons or keys associated with the user inputs. The keypad display may include, among other displays, backlit LCDs, reflective LCDs, electroluminescent (EL) displays, organic light-emitting diodes (OLED), electrophoretic displays (EPD), and bistable displays. The keypad display has different characteristics from the main (or application) display module such as lower power consumption, slower response speed, different pixel resolution, different color qualities, different sizes, and flexibility of the substrate.

Example Electronic Device

Figure 1:
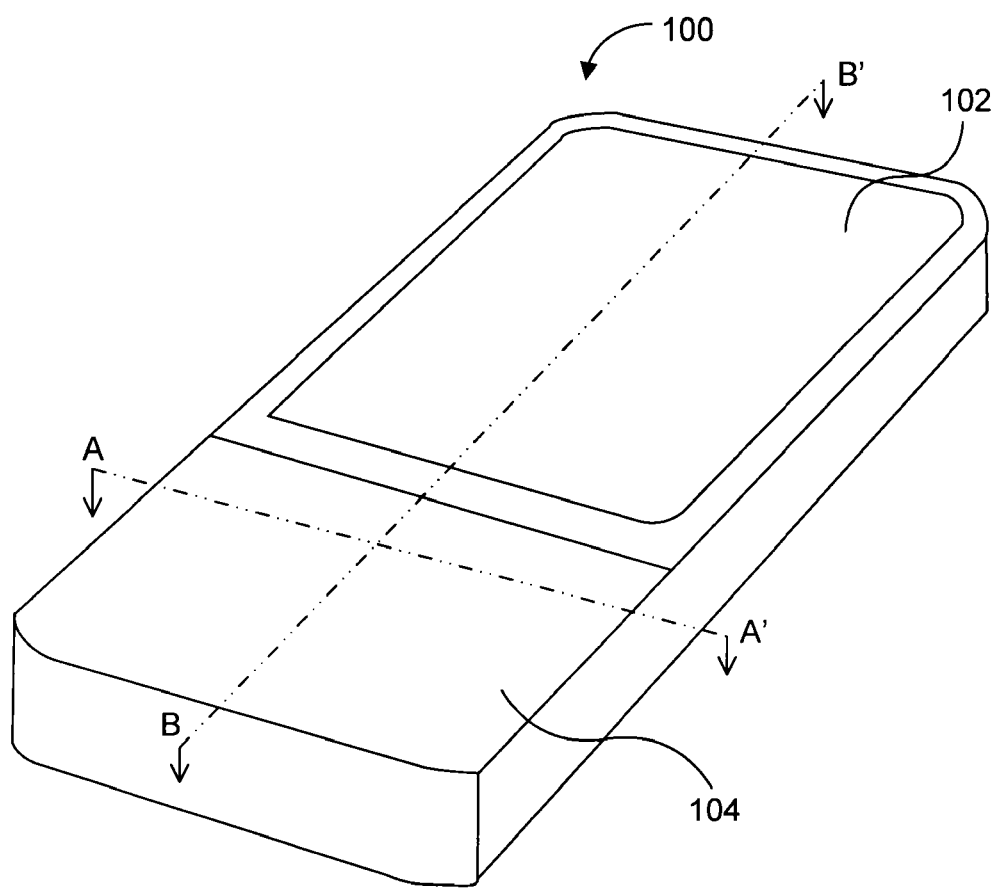
FIG. 1 is an isometric view illustrating a smartphone with a keypad display, according to one embodiment.

FIG. 1 is an isometric view illustrating a smartphone 100 with a user interface according to one embodiment. The smartphone 100 includes a main (or application) display module 102 and a keypad module 104. The main (or application) display module 102 and the keypad module 104 form a user interface of the smartphone 100. The main (or application) display module 102 and the keypad module 104 are provided on the same side of the smartphone 100, adjacent to each other to enable the user of the smartphone 100 to access and use both modules conveniently. Moreover, by placing the two display modules adjacent to each other allows the form factor of the smartphone 100 to become compact.

In one embodiment, the top surface of the main (or application) display module 102 is flush with the top surface of the keypad module 104. By having the top surfaces at the same level, the smartphone 100 is less susceptible to scratches or damages that may be caused by any protruding surfaces. Moreover, the plane top surface of the smartphone 100 is aesthetically pleasing.

In one embodiment, the main (or application) display module 102 includes a touchscreen that allows sensing of the user inputs. Examples of touchscreen include resistive touchscreens, surface acoustic wave (SAW) touchscreens, capacitive touchscreens, infrared touchscreens, strain-gauge touchscreens, optical imaging touchscreens, touchscreens using dispersive signal technology, and touchscreens using acoustic pulse recognition. The main (or application) display module 102 is a high resolution display that may be implemented by using various types of display technology including emissive/transmissive displays and reflective displays. In one embodiment, the main (or application) display module 102 has a high response speed and high resolution adapted to display application views. The application views include graphical user interfaces, images, videos and the like.

In one embodiment, the keypad module 102 includes a keypad display. The keypad display renders numeric, alphabet and character buttons (or keys) as well as functional control buttons or keys (e.g., control wheel, play, stop, pause, fast-forward, and rewind). The keypad display that can also be implemented by using various types of display technology including emissive/transmissive displays and reflective displays. In one embodiment, the keypad display is a display device that consumes less power compared to the main (or application) display module. The keypad display may be turned on for a prolonged time even when the user is not actively using the smartphone 100. In contrast, the main (or application) display module is generally activated intermittently only when the user is actively using the smartphone 100. Therefore, it is advantageous to implement the keypad display using a display device that consumes less energy compared to the main (or application) display of the main (or application) display module.

In one embodiment, the keypad display also has a lower response speed and a lower resolution compared to the main (or application) display module. Compared to the application views displayed on the main (or application) display module 102, the keypad display changes less often (only when the input modes of the smartphone changes) and less dynamically compared to the application views of the main (or application) display module. Therefore, the keypad display need not have the high response speed and resolution as required by the main (or application) display module 102.

In one embodiment, the keypad display is a monochrome display. Color display devices tend to be more expensive and consume more power compared to monochrome displays. Also, there is less advantage of providing color capabilities to the keypad display because the keypad display shows less information compared to the main (or application) display module 102.

In one embodiment, the main (or application) display module 102 is a backlit LCD, and the keypad display is a bistable display. The backlit LCD displays dynamic images that enable the user to interactively use the application views on the smartphone 100. The bistable display, on the other hand, provides sufficient indication to identify the buttons or keys while consuming less amount of power. The bistable display for use in the keypad display includes, among others, E-ink of E Ink Corporation (Cambridge, Mass.), Interferometric Modulator (IMOD) of Qualcomm (San Diego, Calif.), and Digital Micro Shutter display of Pixtronix (Wilmington, Mass.). Using the bistable display for the keypad display is especially advantageous because the keypad display does not change its images often. Because the bistable display consumes a minimal amount of power when the images remain unchanged, the bistable display is especially adapted for the keypad display.

In one embodiment, the main (or application) display module 102 is a touchscreen that includes a touch panel for sensing the user inputs via fingers or a stylus, as explained in detail below with reference to FIGS. 2 and 3. In one embodiment, the keypad module 104 also includes a touch panel for sensing the user inputs via fingers, as explained below with reference to FIGS. 2 and 3. In another embodiment, the keypad module 104 includes a set of mechanical switches to sense the user inputs, as explained in detail below with reference to FIG. 4.

Figure 2:
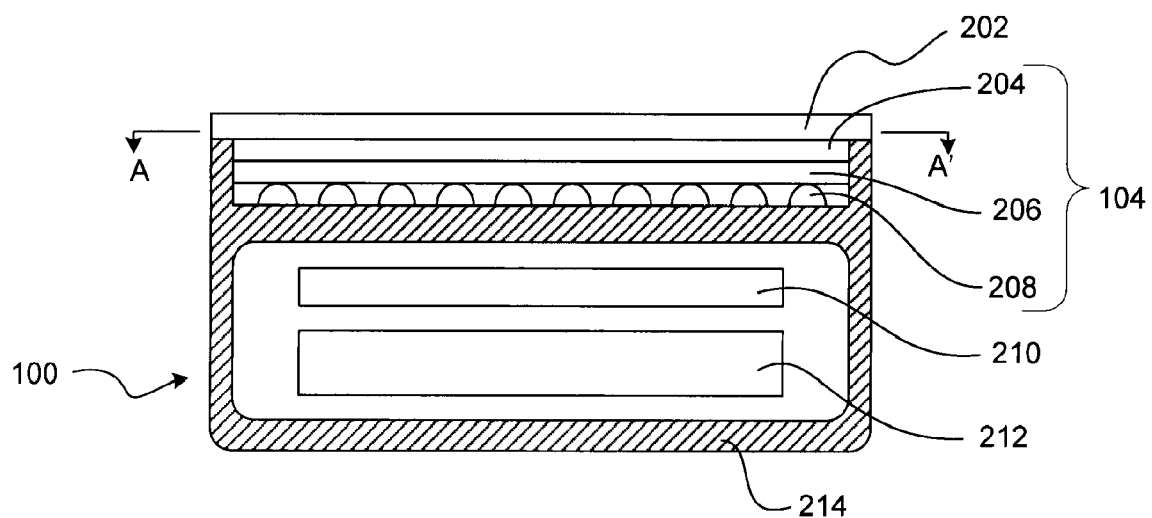
FIG. 2 is a sectional view of the smartphone according to one embodiment, taken along line A-A' of FIG. 1.

FIG. 2 is a sectional view of the smartphone 100 of FIG. 1 according to one embodiment illustrating the section taken along line A-A' of FIG. 1. The components of the smartphone 100 illustrated in FIG. 2 are explained briefly to the extent they are directly related to the invention. The smartphone 100 includes, among other components, the keypad module 104, a printed circuit board (PCB) 210, a battery 212, and a casing 214. The keypad module 104 includes, among other components, a keypad display 204, a touch panel 206, and a set of tactile switches or metal snap domes 208. Each of these components is described below in detail. In one embodiment, a flexible printed circuit (FPC) is used in place of the PCB 210.

The PCB 210 may include, among other components, a processor, one or more storage medium (e.g., flash memory or hard drive), and one or more buses connecting these components as explained in detail below with reference to FIGS. 5 and 6.

The keypad display 204 receives power from the battery 212 and displays keypads in various configurations. In one embodiment, the keypad display 204 includes a backlight layer (not shown) to illuminate the keypad display 204. In another embodiment, a front light (not shown) is provided to illuminate the keypad display 204. The keypad display 204 is coupled to the PCB 210 to receive signals to modify the keypad displayed on the keypad display 204. In another embodiment, the keypad display 204 is a reflective type that provides hi-contrast images without any backlight. In one embodiment, the keypad display 204 is flexible so that the user can sense the tactile feedback from the tactile switches or metal snap domes 208 after pressing the keypad display 204. Using tactile switches or metal snap domes 208 are advantageous compared to other tactile feedback mechanisms (e.g., a battery powered vibrator) because they are reliable, inexpensive to implement, and do not consume power.

The touch panel 206 is placed on the top of the tactile switches or metal snap domes 208 and below the keypad display 204. The touch panel 206 may use any type of overlays for sensing users' touch including, among other overlays, a resistive touch panel, and a capacitive touch panel. The touch panel 206 is also coupled to the PCB 210 via a line (not shown) to send the user input signals to the PCB 210.

One or more tactile switches or metal snap domes 208 are located between the casing 214, and the touch panel 206. The one or more tactile switches or metal snap domes 208 react to the pressure exerted by the user's fingers to provide the tactile feedback to the user. By providing the tactile feedback, the user may conveniently sense whether the keypad was properly pressed without resorting to other changes in the smartphone 100 (e.g., changes in the application views of the main (or application) display module 102 responding to the input). In one embodiment, the touch panel 206 senses the location of the keypad being pressed, and the tactile switches or metal snap domes 208 also function to gate any operation intended by the user's keypad operation. That is, the touch of the keypad must be followed by sufficient pressure on the tactile switches or metal snap domes 208 to activate the tactile switch or metal snap domes 208. The intended operation of the smartphone 100 is prompted only when the touch panel 206 senses the location of the keypad being pressed, and the tactile switch or metal snap domes 208 send signals to the PCB 210. Such gating mechanism is advantageous because it prevents or reduces unwanted keypad inputs.

Figure 3:
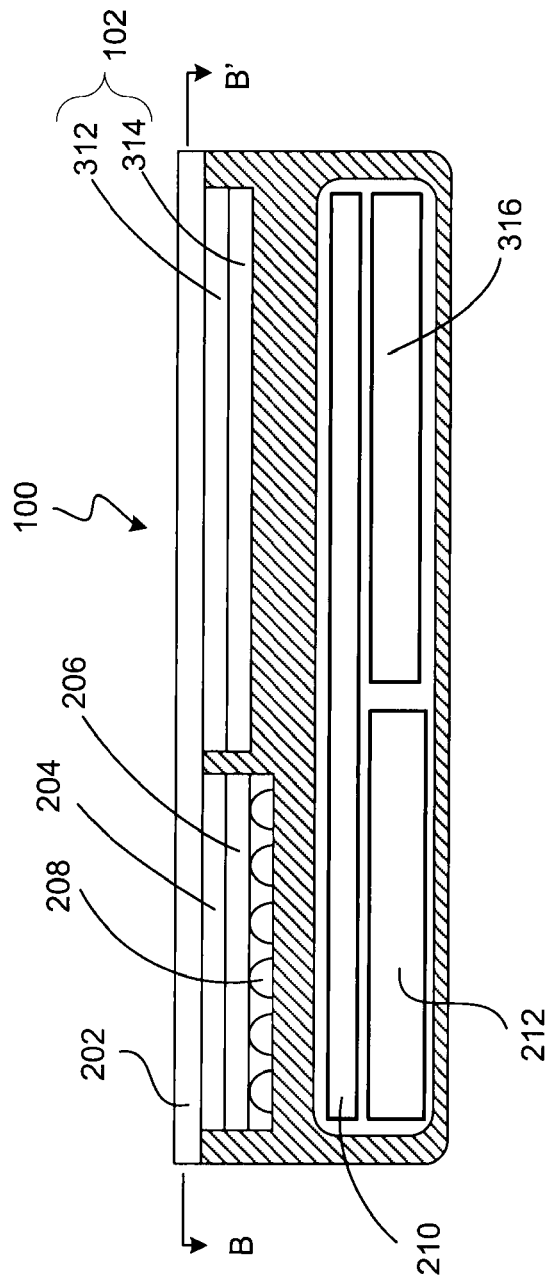
FIG. 3 is a sectional view of the smartphone according to one embodiment, taken along line B-B' of FIG. 1.

FIG. 3 is a sectional view of the smartphone 100 of FIG. 1, according to one embodiment illustrating the section taken along line B-B' of FIG. 1. In FIG. 3, the main (or application) display module 102, and circuitry 316 are illustrated in addition to the components explained above in detail with reference to FIG. 2.

The main (or application) display module 102 includes, among other components, a main (or application) display 312, and a main (or application) touch panel 314. The main (or application) display 312 displays the applications views to the user. The main (or application) touch panel 314 senses the user input via a finger or a stylus. The main (or application) display 312 and the main (or application) touch panel 314 of the main (or application) display module 102 are coupled to the PCB 210 via a line (not shown).

In the embodiment of FIG. 3, a single protective film 202 is placed on the top of the keypad display 204 and the main (or application) display 312. The protective film 202 provides protection against scratches and dirt as well as giving a smooth appearance of a continuous surface stretching from the keypad display 204 to the main (or application) display 312. The protective cover 202 is flexible and thin so as not to block the tactile feedback from the tactile switches or metal snap domes 208.

Figure 4:
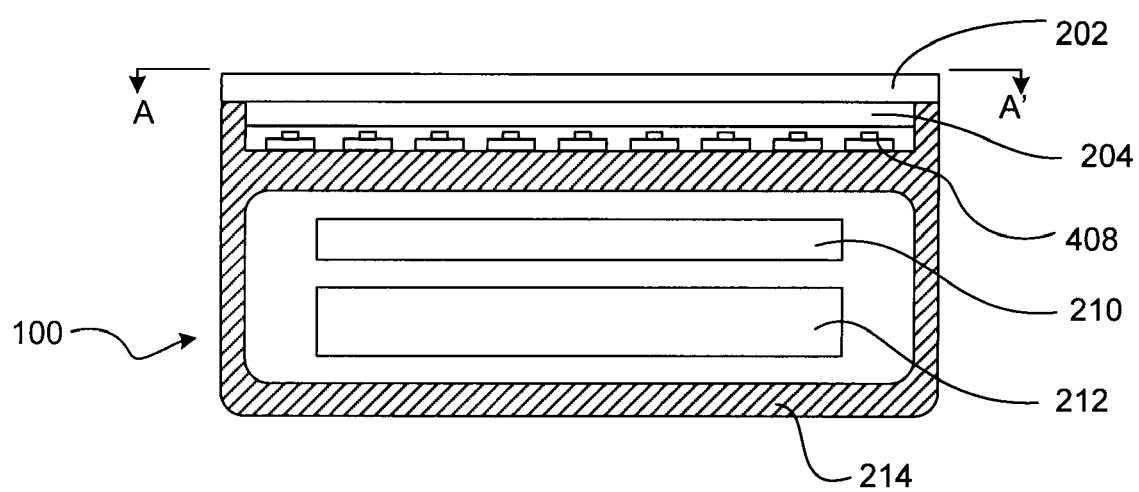
FIG. 4 is a sectional view of the smartphone according to another embodiment, taken along line A-A' of FIG. 1.

FIG. 4 is a sectional view of a smartphone 100, according to another embodiment. The embodiment of FIG. 4 is essentially the same as the embodiment of FIGS. 2 and 3 except that a set of mechanical switches 408 is provided to receive the user input instead of a touch panel. The mechanical switches 408 senses the user input as well as providing the tactile feedback so that the user can sense that the buttons or keys displayed on the keypad display 204 are properly pressed. The mechanical switches 408 are coupled to the PCB 210 via a line (not shown) to communicate the user input to the PCB 210.

Example Components of Smartphone

Figure 5:
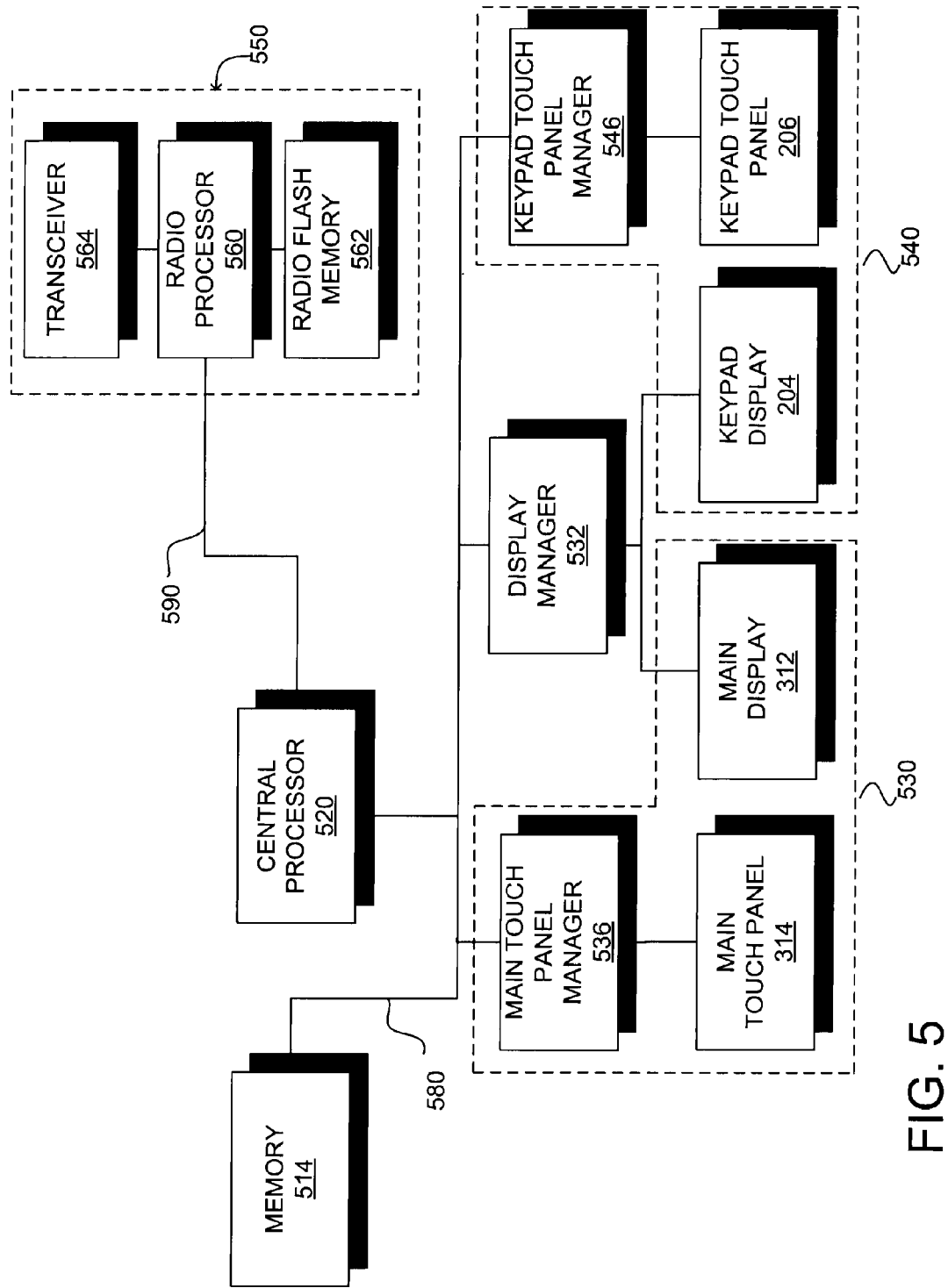
FIG. 5 is a block diagram illustrating the components of a smartphone, according to one embodiment.

Referring next to FIG. 5, a block diagram illustrates one embodiment of an architecture of the smartphone 100. The smartphone 100 includes, among other components, memory 514, a central processor 520, a main (or application) display subsystem 530, a keypad subsystem 540, a display manager 532, and a radio subsystem 550. The central processor 220 communicates with memory 514, the main (or application) display subsystem 530, and the keypad subsystem 540 via a bus 580. The central processor 520 communicates with the radio subsystem 550 via another bus 590.

In one embodiment, the display manager 532 renders images for display on the main (or application) display 312 and the keypad display 204. The keypad display 204 is a low resolution display. Therefore, the keypad display 204 may share the display manager 532 with the main (or application) display 312 without significantly increasing hardware or software requirements of the display manager 532. It is advantageous to use the display manger 532 to render the images for both the keypad display 204 and the main display 312 because the number of hardware or software components may be reduced. Also, by sharing the display manager 532, the changes in images displayed on the keypad display 204 and the main display 312 may be more effectively synchronized. The display manager 532 communicates with the central processor 520 and the memory 514 via the bus 580.

In one embodiment, the main (or application) display subsystem 530 includes, among other components, a main (or application) display 312, a main (or application) touch panel manager 536, and a main (or application) touch panel 314. The main (or application) touch panel 538 senses the user input and sends a sensor signal to the main (or application) touch panel manager 536. The touch panel manager 536 processes the sensor signal, and generates a binary sensor data that is sent to the central processor 520 and the memory 514 via the bus 580.

In one embodiment, the keypad subsystem 540 includes, among other components, a keypad display 204, a keypad touch panel manager 546, and a keypad touch panel 206. The keypad display 204 is coupled to the keypad manager 542 to display the keypads in accordance with the signal from the keypad manager 542. The keypad touch panel 206 senses the user input and sends a sensor signal indicating the user input signal to the keypad touch panel manager 546. The keypad touch panel manager 546 processes the sensor signal into a binary sensor data that is sent to the memory 514 and the central processor 520 via the bus 580.

The display manager 532, the main (or application) touch panel manager 536, and the keypad touch panel manager 546 may be implemented as software, firmware, hardware or combinations thereof Also, one or more of these elements may be combined into a single module or be separated into multiple components.

The radio subsystem 550 includes a radio processor 560, a radio memory 562, and a transceiver 564. The transceiver 564 may be two separate components for transmitting and receiving signals or a single component for both transmitting and receiving signals. In either instance, it is referenced as a transceiver 564. The receiver portion of the transceiver 564 communicatively couples with a radio signal input of the smartphone 100, e.g., an antenna, where communication signals are received from an established call (e.g., a connected or on-going call). The received communication signals include voice (or other sound signals) received from the call and processed by the radio processor 560 for output through the speaker (not shown). The transmitter portion of the transceiver 264 communicatively couples a radio signal output of the smartphone 100, e.g., the antenna, where communication signals are transmitted to an established (e.g., a connected (or coupled) or active) call. The communication signals for transmission include voice, e.g., received through the microphone (not shown) of the smartphone 100, (or other sound signals) that is processed by the radio processor 560 for transmission through the transmitter of the transceiver 564 to the established call.

In one embodiment, the central processor 520 executes logic (by way of programming, code, instructions) corresponding to executing applications on the memory 514. Numerous other components and variations may be made to the hardware architecture of the smartphone 100, thus an embodiment such as shown by FIG. 5 is merely illustrative.

Example Components for Display Rendition

Figure 6:
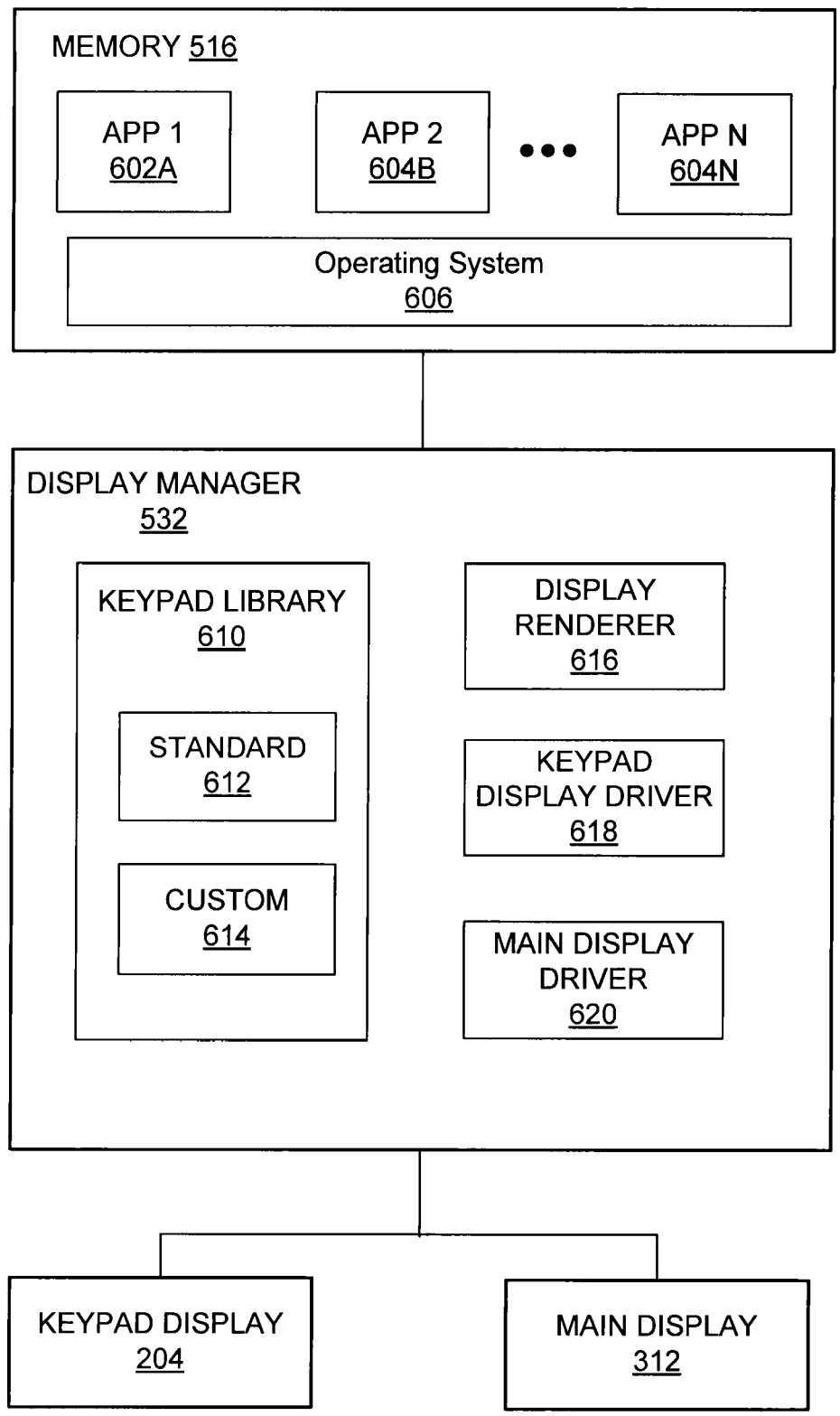
FIG. 6 is a block diagram illustrating components for rendering keypads and application views, according to one embodiment.

FIG. 6 is a block diagram illustrating components for rendering images on the keypad display 204 and the main (or application) display 312, according to one embodiment. The display manager 532 performs operations necessary for rendering the keypads on the keypad display 204 and application views on the main (or application) display 312. The keypad manager 542 is associated with application programs 602A-N running on the memory 516 of the smartphone 100. Each application program 602A-N running on the memory 516 may require the smartphone 100 to operate in one or more input modes. Alternatively, more than one application programs 602A-N may share the same input mode of the smartphone 100. The operating system 606 coordinates the requests from the application programs 602A-N to use a certain keypad configuration, and sends the instructions to the display manager 532.

The display manager 532 includes, among other components, a keypad library 610, a keypad display renderer 616, a keypad display driver 618, and a main display driver 620. The keypad library 610 stores various keypad configurations that can be invoked by the operating system 606. Specifically, the keypad library 610 includes a standard library 612 and a custom library 614. The standard library 612 stores a preconfigured set of keypad configurations that may be invoked by the operating system 606. The custom library 614 is a custom set of keypad configurations that may be loaded and stored for use from the application programs 602A-N or from the user's individual settings.

The keypad display renderer 616 loads the keypad configurations from the application keypad library 610 according to the instructions from the operating system 606. The keypad display renderer 616 generates characters, symbols, or images for display on the keypad display 204.

The keypad display driver 618 is a display driver that is adapted specifically to the keypad display 204. The keypad display driver 618 receives the information regarding the characters, symbols, or images from the keypad display renderer 616 and generates timing signals to the keypad display device 204 to form the corresponding characters, symbols or images on the keypad display 204.

The main display driver 620 is a display driver that is adapted specifically to the main (or application) display 312. The main display driver 620 generates timing signals to the keypad display device 204 to form images the main display 312. In one embodiment, the keypad display driver 618 is integrated with a main display driver 620.

One or more components of the display manager 532 may be implemented as software, firmware, hardware or a combination thereof. Also, one or more components of the display manager 532 may be implemented as a single component instead of separate components.

Example Keypad Displays

Figure 7:
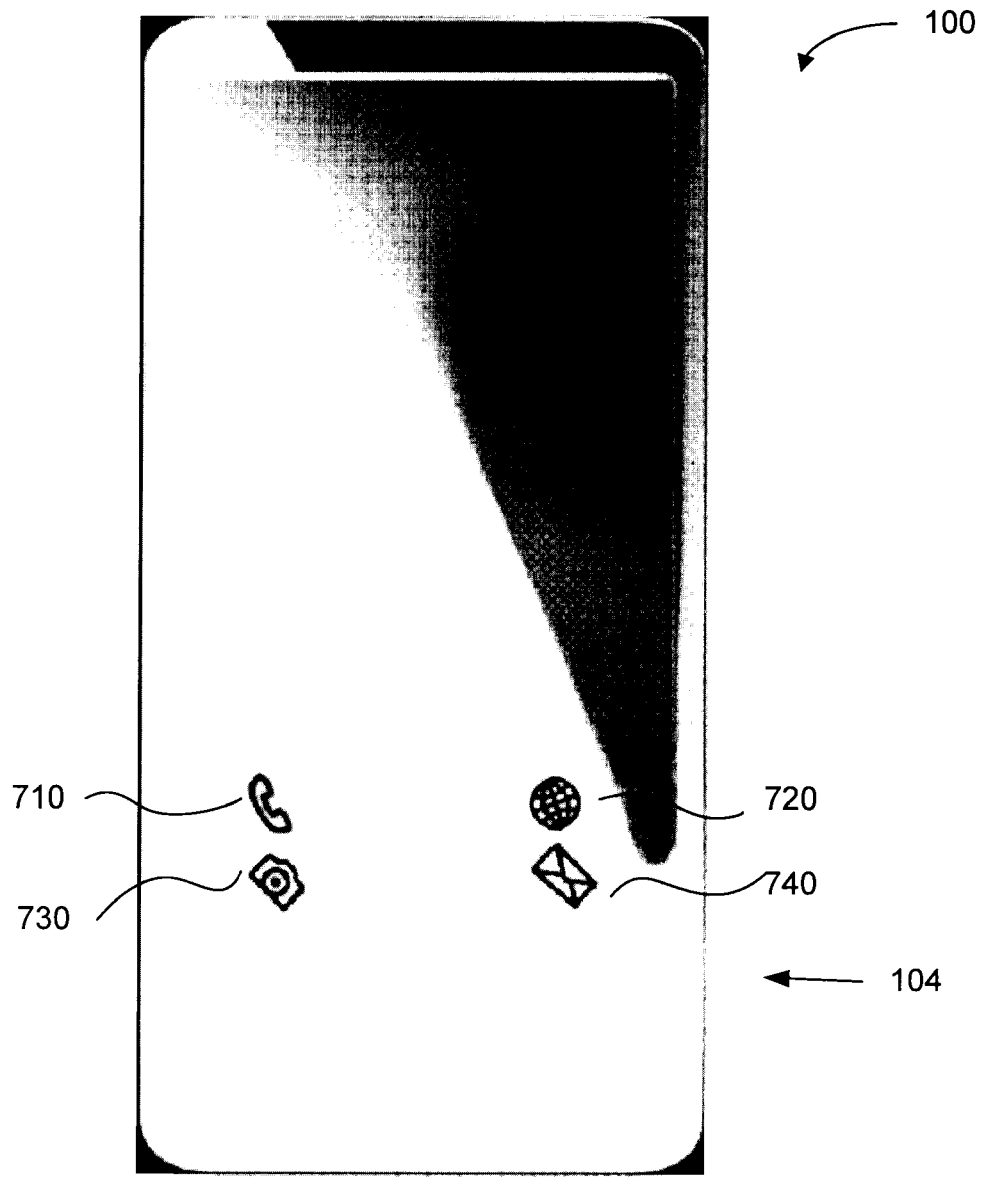
FIG. 7 is a diagram illustrating a keypad display during a functional input mode, according to one embodiment.

FIG. 7 is a diagram illustrating a keypad display 104 during a functional input mode, according to one embodiment. In this example embodiment, the keypad display 104 only displays four symbols (or icons) representing four major functional modes of the smartphone 100. A telephone button 710 indicates a call place mode where the user may make telephone calls. A globe button 720 indicates an internet mode where the smartphone activates a web browser. A camera button 730 indicates a camera mode where the user can take pictures using the smartphone 100. Finally, an envelope button 740 indicates an email mode where the user can view or edit emails. In one embodiment, the smartphone 100 enters the functional input mode when the smartphone is not in use or when the user restarts the smartphone 100.

Figure 8:
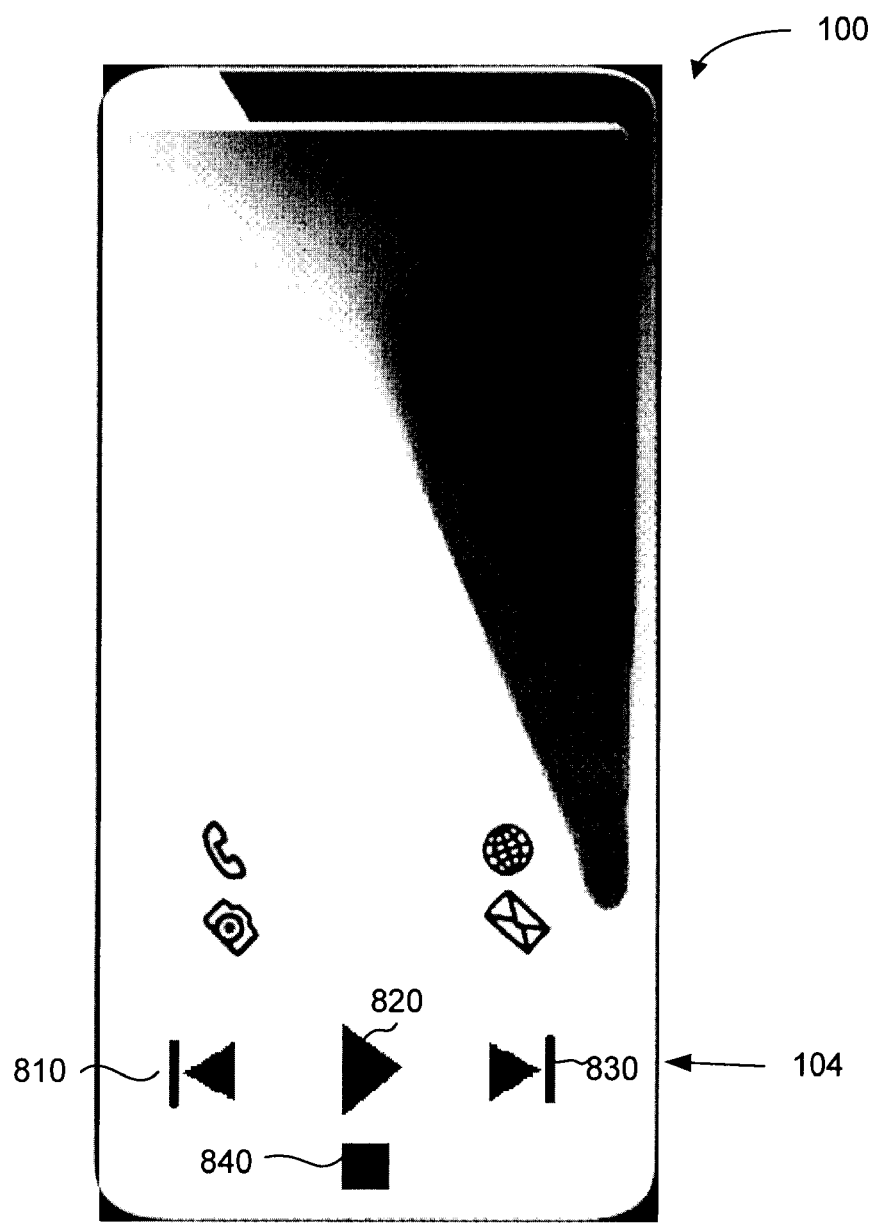
FIG. 8 is a diagram illustrating a keypad display during a music player input mode, according to one embodiment.

FIG. 8 is a diagram illustrating a keypad display 104 during a music player input mode, according to one embodiment. In this mode, the keypad display 104 displays four additional buttons or keys 810 to 840. This input mode is displayed, for example, when playing MP3 or other audio files on the smartphone 100. The button 810 is pressed when the user wants to play a previous song, the button 820 is pressed when the user wants to play the current song, the button 830 is pressed when the user wants to play a next song, and button 840 is pressed when the user wants to stop the song being played.

Figure 9:
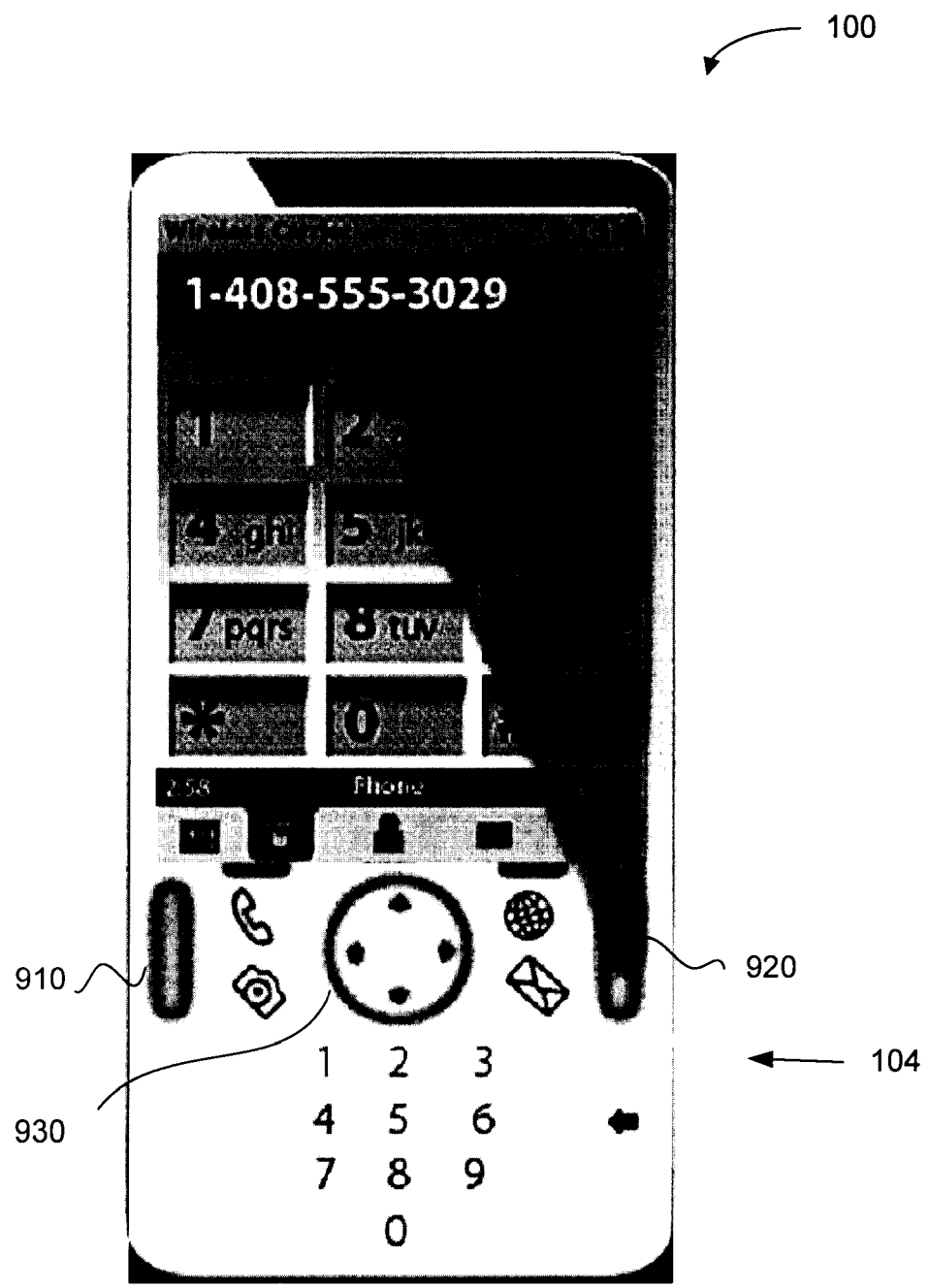
FIG. 9 is a diagram illustrating a keypad display during a number input mode, according to one embodiment.

FIG. 9 is a diagram illustrating a keypad display 104 during a number input mode, according to one embodiment. This input mode is activated, for example, when placing or receiving a phone call. In this mode, numbers in addition to the functional buttons or keys are displayed. In this example, no alphabet letters are displayed because the input of alphabet letters is not required when placing or receiving a call. The number input mode can be toggled to other input modes using buttons or keys 910, 920, or 930 displayed on the keypad display 104.

Figure 10:
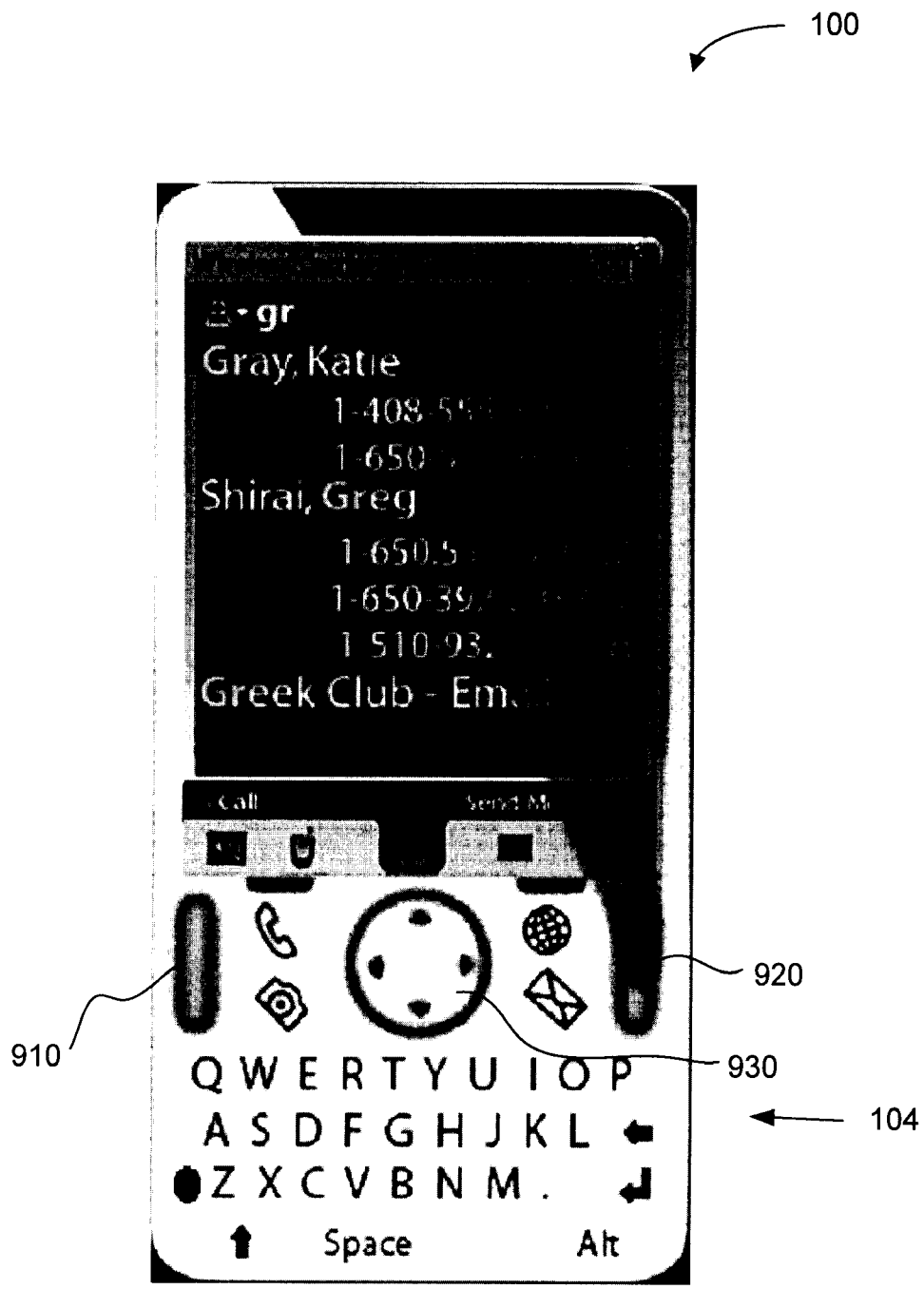
FIG. 10 is a diagram illustrating a keypad display during an alphabet input mode, according to one embodiment.

FIG. 10 is a diagram illustrating a keypad display 104 during an alphabet input mode, according to one embodiment. This input mode is activated, for example, when querying an address book stored on the smartphone 100 or when editing email messages. Note that no number is displayed on the keypad display 104. Like in the example of FIG. 9, buttons or keys 910, 920, or 930 can be pressed to toggle to other input modes.

Figure 11:
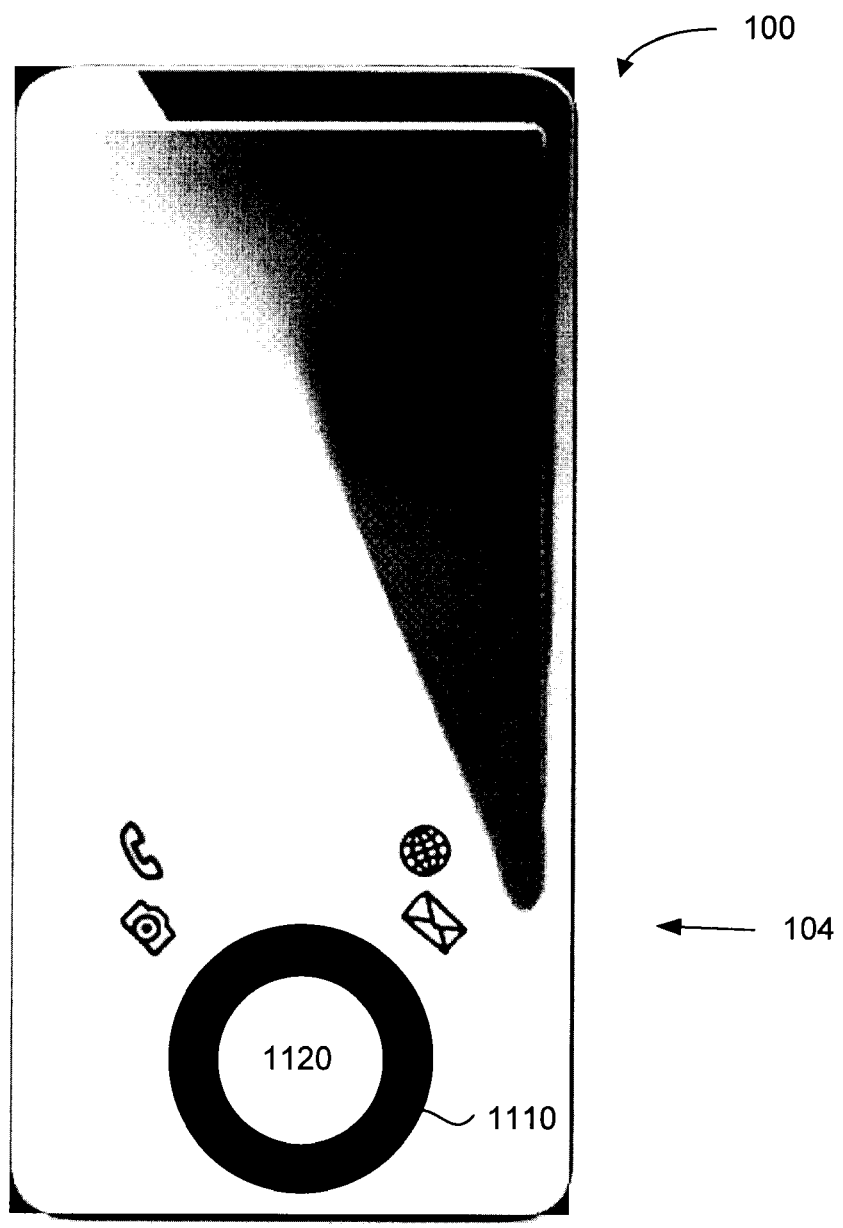
FIG. 11 is a diagram illustrating a keypad display displaying a scroll wheel, according to one embodiment.

FIG. 11 is a diagram illustrating a keypad display 104 during a scroll wheel input mode, according to one embodiment. In this input mode, a scroll wheel 1110 is displayed. The center portion 1120 servers as an "enter" key or button. This input mode is activated, for example, in applications that require a lot of scroll actions.

As shown in the above example keypad configurations, the keypad display 104 displays different combination of buttons or keys (or icons) depending on the input modes. Therefore, the user is less likely to experience confusion with crammed buttons or press wrong buttons. Also, the appearance of the keypad is simplified and aesthetically enhanced.

Alternative Examples

In one embodiment, the electronic device may include more than one keypad displays. A number of smaller keypad displays may be juxtaposed or be tiled on the surface of the electronic device. Then, a protective film may be covered over the keypad displays to give the appearance of a single input module.

The keypad display may also have an arbitrary shape. The keypad display may be shaped in circle, triangle or any other geometric shapes to suit the form factor of the electronic device. Also, the keypad display may span more than one side of the electronic device. For example, the keypad display may cover both the top surface and the side surfaces of the electronic device.

The software for components such as the display manager 532 may be written or coded using a programming language. Examples of programming languages may include C, C++, BASIC, Perl, Matlab, Pascal, Visual BASIC, JAVA, ActiveX, assembly language, machine code, and so forth. The instructions may include any suitable type of code, such as source code, object code, compiled code, interpreted code, executable code, static code, dynamic code, and the like. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application programming interfaces (API), instruction sets, computing code, computer code, code segments, computer code segments, words, values, symbols, or any combination thereof. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Displaying different keypad configurations on a keypad display simplifies the appearance of the keypads and minimizes the user's confusion in operating the electronic devices. Also, the keypad displayed to the user is simplified, giving an aesthetically pleasing appearance. Further, by using a display device adapted for keypads, the power consumption is reduced. The keypads also provide tactile feedback to the user, which allows the user to more easily sense whether a button on the keypad is properly pressed.

Upon reading this disclosure, those of skill in the art will appreciate still additional alternative structural and functional designs for a user interface and electronic device through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A mobile computing device comprising:
   a first display having a first top flat surface and having a first power consumption;
   a keypad display module separate from the first display, the keypad display module comprising a second display, the second display having a second top flat surface and a second power consumption which is less than the first power consumption, and a touch sensor adjacent to the second display for sensing user inputs on the second display;
   one or more processors coupled to the first display and the keypad display module, the one or more processors to:
      operate a plurality of applications, each of the plurality of applications corresponding to a keypad interface;
      receive a selection to operate one of the plurality of applications from a user; and
      based on the selected application on the mobile computing device, (i) provide content on the first display corresponding to the operated application, (ii) select a keypad interface corresponding to the operated application from a plurality of keypad interfaces stored in a library of keypad interfaces, the library including at least one of a set of preconfigured keypad interfaces and at least one of a set of keypad interfaces previously configured and stored by the user, and (iii) render the selected keypad interface on the second display.

2. The mobile computing device of claim 1, wherein the first display comprises a high resolution liquid crystal display (LCD), the second display comprises a low resolution bistable display, the first display comprising a first touch panel, and the touch sensor comprising a second touch panel.

3. The mobile computing device of claim 1, further comprising a protective film covering both the first top flat surface and the second top flat surface.

4. The mobile computing device of claim 1, wherein the second display is implemented as a flexible substrate, and the keypad display module further comprises a plurality of tactile switches or metal snap domes between the touch sensor and a body of the mobile computing device, the tactile switches or metal snap domes providing tactile feedback and gate operation of the keypad display module, wherein the plurality of tactile switches or metal snap domes are dispersed below the keypad display module.

5. The mobile computing device of claim 1, further comprising a common display manager to render on the first display the content corresponding to the application being operated on and to render the corresponding keypad interface.

6. The mobile computing device of claim 1, wherein the touch sensor comprises a series of mechanical switches provided below the second keypad display module.

7. The mobile computing device of claim 1, wherein the plurality of keypad interfaces comprises a first keypad interface including buttons for receiving inputs for alphabet letters but not numbers, and a second keypad interface including buttons for receiving inputs for the numbers but not the alphabet letters.

8. The mobile computing device of claim 1, wherein the keypad interface includes a scroll wheel.

9. An electronic device comprising:
   a housing comprising a first face;
   a first display provided on the first face and having a first top flat surface, and having a first power consumption; and
   a keypad display module provided on the first face, separate from and adjacent to the first display, the keypad display module comprising a second display, the second display having a second top flat surface and having a second power consumption which is less than the first power consumption, and a touch sensor for sensing user inputs on the second display;
   one or more processors coupled to the first display and the keypad display module, the one or more processors to:
      operate a plurality of applications, each of the plurality of applications corresponding to a keypad interface;
      receive a selection to operate one of the plurality of applications from a user; and
      based on the selected application on the mobile computing device, (i) provide content on the first display corresponding to the operated application (ii) select a keypad interface corresponding to the operated application from a plurality of keypad interfaces stored in a library of keypad interfaces, the library including at least one of a set of preconfigured keypad interfaces and at least one of a set of keypad interfaces previously configured and stored by the user, and (iii) render the selected keypad interface on the second display.

10. The electronic device of claim 9, wherein the first display comprises a high resolution liquid crystal display (LCD), the second display comprises a low resolution bistable display, the first display comprising a first touch panel, and the touch sensor comprising a second touch panel.

11. The electronic device of claim 9, further comprising a protective film covering both the first top flat surface and the second top flat surface.

12. The electronic device of claim 9, wherein the second display is implemented as a flexible substrate, and the keypad display module further comprises a plurality of tactile switches or metal snap domes between the touch sensor and a body of the mobile computing device, the tactile switches or metal snap domes providing tactile feedback, wherein the plurality of tactile switches or metal snap domes are dispersed below the keypad display module.

13. The electronic device of claim 9, wherein the touch sensor comprises a series of mechanical switches provided below the keypad display module.

14. The electronic device of claim 9, wherein the electronic device is a smartphone.

15. The electronic device of claim 9, wherein the plurality of keypad interface comprises a first keypad interface including buttons for receiving inputs for alphabet letters but not numbers, and a second keypad interface including buttons for receiving inputs for the numbers but not the alphabet letters.

16. The electronic device of claim 9, wherein the keypad interface includes a scroll wheel.

* * * * *